United States Patent [19]

Farrar, Jr. et al.

[11] Patent Number: 5,270,396
[45] Date of Patent: Dec. 14, 1993

[54] SEQUENTIAL COUPLING IN FORMATION OF RESINOUS BLOCK COPOLYMERS

[75] Inventors: Ralph C. Farrar, Jr.; George A. Moczygemba; William J. Trepka, all of Bartlesville, Okla.

[73] Assignee: Phillips Petroleum Company, Bartlesville, Okla.

[21] Appl. No.: 885,715

[22] Filed: May 18, 1992

Related U.S. Application Data

[63] Continuation-in-part of Ser. No. 549,031, Jul. 6, 1990, abandoned.

[51] Int. Cl.$^5$ .............................................. C08F 297/04
[52] U.S. Cl. .................................... 525/271; 525/313; 526/79; 526/173; 526/178; 526/208
[58] Field of Search ................ 526/79, 173, 178, 208; 525/271, 313

[56] References Cited

U.S. PATENT DOCUMENTS

| | | | |
|---|---|---|---|
| 3,639,517 | 2/1972 | Kitchen et al. | 260/879 |
| 3,668,279 | 6/1972 | Loveless et al. | 260/879 |
| 4,020,258 | 4/1977 | Farrar | 526/178 |
| 4,584,346 | 4/1986 | Kitchen | 525/98 |

FOREIGN PATENT DOCUMENTS 8910378  11/1989  PCT Int'l Appl. .

Primary Examiner—Joseph L. Schofer
Assistant Examiner—Tom Weber
Attorney, Agent, or Firm—Morrison Bennett

[57] ABSTRACT

A method for preparing resinous copolymers by sequential charge copolymerization of at least two charges, at least one being a conjugated diene and at least one being a monovinylarene; followed by a charge of a polyfunctional coupling agent; and the final charge being an essentially difunctional coupling agent. The copolymer made by this method and articles made from this copolymer are also provided.

17 Claims, 3 Drawing Sheets

FIG. 3b
UNCOUPLED PARENT

FIG. 3d
VIKOFLEX COUPLED

FIG. 3a
CONTROL, NO MULTIFUNCTIONAL COUPLING AGENT

FIG. 3c
TETRAMETHOXYSILANE COUPLED

SEQUENTIAL COUPLING IN FORMATION OF RESINOUS BLOCK COPOLYMERS

This application is a continuation-in-part of application Ser. No. 07/549,031, filed Jul. 6, 1990, now abandoned.

BACKGROUND OF THE INVENTION

This invention relates to resinous copolymers. In one aspect, this invention relates to a novel polymerization process for the production of polymodal resinous block copolymers with improved melt strength properties.

Resinous block copolymers have been produced by methods employing various sequential polymerization steps. Among the pioneer inventions in the field of resinous block copolymers are such patents as U.S. Pat. No. 3,639,517 to Kitchen and Szalla, U.S. Pat. No. 4,080,407 to Fodor, and U.S. Pat. No. 4,091,053 to Kitchen.

Much effort has been directed to the preparation of substantially transparent block copolymer resins with a variety of block structures produced by a variety of monomer addition sequences and a variety of coupling agents.

One of the more important applications for substantially transparent block copolymer resins is in the packaging and related industries where there is a need for thermoplastic polymers suitable for use in conventional injection and blow molding and in other methods of forming plastics into containers, tubes, film and the like. For applications which require blow molding of the thermoplastic resin it is important that the parison have sufficient melt strength to support itself when blow molding larger parts. Better melt strength is normally associated with low melt flow; however, melt flow must be high enough to maintain processability.

SUMMARY OF THE INVENTION

It is an object of this invention to provide resinous copolymers which have improved melt strength properties. It is another object of this invention to provide resinous copolymers which have good melt strength while maintaining processability. An object of this invention is to provide a substantially transparent copolymer that has sufficient melt flow to maintain processability in blow molding operations and also has sufficient melt strength to support the parison during blow molding of larger objects. It is yet another object of this invention to provide methods for producing these resinous copolymers.

In accordance with this invention copolymers are prepared by a process of sequential charge copolymerization comprising the solution polymerization of at least two charges, at least one of these being a conjugated diene and at least one of these being a monovinylarene; followed by a charge of a polyfunctional coupling agent; and the final charge being essentially a difunctional coupling agent.

In accordance with one embodiment of this invention a method for preparing a polymer comprises:

solution polymerization of at least one monovinylarene monomer and at least one conjugated diene monomer in a ratio of about 55 to 95 weight percent monovinylarene and about 45 to 5 weight percent conjugated diene, by a sequential charge polymerization process to produce growing polymer chains, said sequential charge polymerization process comprising:

charging with a monovinylarene and a monoalkali metal initiator;

charging with a monovinylarene and a monoalkali metal initiator;

charging with a conjugated diene monomer;

charging with a monovinylarene and a monoalkali initiator;

charging with a conjugated diene monomer;

charging with an amount of a polyfunctional coupling agent insufficient for complete coupling of said growing polymer chains;

after substantially complete reaction of said polyfunctional coupling agent, charging with a difunctional coupling agent.

BRIEF DESCRIPTION OF THE DRAWINGS

In the drawings which form a part hereof.

DETAILED DESCRIPTION OF THE INVENTION

The polymers of this invention are characterized as resinous, polymodal block copolymers of at least one conjugated diene with at least one monovinylarene, and are prepared so that at least a portion of the final product is of a branched coupled character.

The copolymers contain about 55 to 95, preferably 60 to 90, more preferably 65 to 85, percent by weight of copolymerized monovinyl aromatic compound (monovinylarene), and correspondingly about 45 to 5, 40 to 10, or 35 to 15 percent by weight of copolymerized conjugated diene. The coupled portions of the resinous, polymodal block copolymers have terminal polymonovinylarene blocks on the extending arms of each linear or radial copolymer molecule, and further contain a central internal block of polyconjugated diene, ignoring any interruption of the internal block by a coupling agent residue. The resinous copolymeric polymodal products also contain portions of linear uncoupled block copolymers of poly(monovinylarene)-poly(conjugated diene); the linear uncoupled block copolymer content is considered to be an important portion of the resinous product with respect to its overall properties.

It has been found that similar copolymers previously known in the art with sufficient melt flow to maintain processability in blow molding operations lacked the necessary melt strength to support the parison during blow molding of larger objects. The present invention has solved that problem by first coupling fewer than all the growing polymer chains with a polyfunctional coupling agent, then completing the coupling in a separate step with essentially no polyfunctional coupling agent and substantially only difunctional coupling agents. This particular sequence and relative amounts of coupling agents are necessary to produce the unique polymodal structure which results from a first, incomplete branched coupling followed by essentially linear coupling.

The detailed description and tables following show the preferred charging sequences and the results of tests of the properties of the inventive copolymer compared with those of copolymers not prepared in accordance with this invention. The differences in results are significant, with the inventive copolymers exhibiting improved melt strength properties.

Polymerization

The solution polymerization process is carried out as is known in the art in a hydrocarbon diluent at any suitable temperature such as in the range of about $-10°$ to 150° C., more usually about 0° to 110° C., at a pressure sufficient to maintain the reaction mixture substantially as a liquid. Preferred are cycloparaffins, alone or in admixture with such as pentane or isooctane. Presently preferred is cyclohexane. As is known, small amounts of polar compounds, such as tetrahydrofuran, can be included in the diluent for vinyl control of the diene polymer blocks, and/or to improve effectiveness of some initiators such as the primary alkyllithium initiators for monovinylarene polymerizations. U.S. Pat. No. 3,639,517 (Kitchen and Szalla), U.S. Pat. No. 4,080,407 (Fodor) and U.S. Pat. No. 4,091,053 (Kitchen) which disclose polymerization procedures are incorporated herein by reference.

The conjugated diene monomers which can be used contain 4 to 6 carbon atoms and include 1,3-butadiene, 2-methyl-1,3-butadiene, 2-ethyl-1,3-butadiene, 2,3-dimethyl-1,3-butadiene and 1,3-pentadiene and mixtures thereof. Presently preferred is 1,3.butadiene.

The monovinylaromatic monomers which can be used contain 8 to 12 carbon atoms and include styrene, alpha-methylstyrene, p-vinyltoluene, m-vinyltoluene, o-vinyltoluene, 4-ethylstyrene, 3-ethylstyrene, 2-ethylstyrene, 4-tert-butylstyrene and 2,4-dimethylstyrene and mixtures thereof. Presently preferred is styrene.

The initators can be any of the organomonoalkali metal compounds known for such purposes. Preferably employed are the hydrocarbylmonoalkali metal compounds which correspond to the formula RM in which R is a hydrocarbyl aliphatic, cycloaliphatic, or aromatic radical, preferably alkyl, and M is an alkali metal, preferably lithium. Presently preferred are alkylmonolithium initators such as sec- and n-butyllithium. The amounts of monoalkali metal-based initiator employed depend upon the desired polymer or incremental block molecular weight, as is known in the art, and are readily determinable from the ranges of molecular weight desired, making due allowance for traces of poisons in the feed streams.

The polymerization is conducted in the substantial absence of air or moisture, preferably under an inert atmosphere. The resulting polymers contain a very high percentage of molecules in which an alkali metal atom is positioned at an end of the polymer chains. Of course, traces of impurities present in the feeds, such as water or alcohol, tend to reduce the amount of monoalkali metal-terminated polymer formed. Thereafter, the coupling steps are performed.

Coupling Reaction

The term "coupling" as used in this application means the bringing together and joining, by means of one or more central coupling atoms or coupling moieties, two or more of the living monoalkali metal-terminated polymer chains.

Typically, the total amount of coupling agent is in the range of about 0.1 to 10 phm (parts per 100 parts by weight of total monomers employed in the polymerization), presently preferably about 0.2 to 1 phm.

For the purposes of this application, polyfunctional (or multifunctional) coupling agents are defined as those having three or more active sites for reaction with polymer lithiums. Polyfunctional coupling agents considered useful in the first coupling step of the inventive process include alkoxysilanes, such as $Si(OR)_4$, $HSi(OR)_3$, $RSi(OR)_3$; cyclic anhydrides such as and their esters and diesters, such as in which R can be alkyl groups containing from 1 to about 18 carbon atoms, with those containing 1 to 4 carbon atoms preferred. Examples of suitable polyfunctional coupling agents include tetramethoxysilane, tetraethoxysilane, tetrabutoxysilane, tetradodecyloxysilane, trimethyoxysilane, triethoxysilane, trihexyloxysilane, phthalic anhydride, 1,2-cyclohexanedicarboxylic anhydride, dimethyl phthalate, dibutyl phthalate, diethyl 1,2-cycyclohexanedicarboxylate, dimethyl isophthalate, dihexyl isophthalate, dimethyl terephthalate, diethyl terephthalate, didodecyl terephthalate, and the like. Each acyl group of the esters and anhydrides is considered to be difunctional for coupling since two molecules of polymer lithium can react with the acyl group. Other acceptable polyfunctional coupling agents are multiisocyanates, multiimines, multianhydrides, multihalides particularly halosilanes, multiesters multiketones tri alkylarylphosphites and alkoxytin compounds. Presently preferred are alkoxysilanes such as tetraethoxysilane, tetramethoxysilane, trimethyoxysilane and triethoxysilane and esters such as dimethyl isophthalate. Most preferred are tetraethoxysilane and tetramethoxysilane. Mixtures of two or more polyfunctional coupling agents can be used.

The first coupling step should be substantially completely reacted before adding the second coupling agent. If both types of coupling agents are added together, difunctional coupling will dominate. The progress of the first coupling step can be determined by gel permeation chromatography (gpc) which will show multifunctional branching by the appearance of several new peaks compared with the gpc curves of products made with essentially difunctional coupling agents or with mixtures of multifunctional and difunctional coupling agents.

Coupling agents considered useful in the second coupling step of the inventive process include a wide range of essentially difunctional (or bifunctional) coupling agents as are known in the art, such as dialdehydes, diketones, dihalosilanes, diepoxides, monoesters, lactones, vegetable oils, epoxidized vegetable oils, and the like. Examples include hexanedial, phthalaldehyde, 2,5-hexanedione, dichlorodimethylsilane, dichlorodiphenylsilane, butadiene dimer diepoxide, methyl benzoate, butyrolactone, refined soybean oil, epoxidized soybean oil, and the like. Presently preferred as the essentially difunctional agent for the second coupling step of this invention is epoxidized vegetable oil. Most preferred is epoxidized soybean oil such as Vikoflex 7170 from Viking Chemical.

Combinations of two or more essentially difunctional coupling agents, including combinations from different functional groups, can be used.

Any effective amount of the coupling agent can be employed in either of the two coupling steps. While the amount is not believed to be particularly critical, an amount sufficient to give multifunctional coupling as determined by gel permeation chromatography is presently preferred in the first coupling step. It is essential that in the first coupling step, the amount of polyfunctional coupling agent added be insufficient for complete coupling of all of the growing polymer chains. In the second coupling step the amount of difunctional coupling agent used is equal to, or in excess of, the amount needed to complete the coupling.

The amount of multifunctional coupling agent in the first step is about 5 to 80 weight percent of the total amount of coupling agents, preferably 10 to 50 weight percent, more preferably 15 to 30 weight percent. The amount of essentially difunctional coupling agent in the second step is about 95 to 20 weight percent of the total coupling agents, preferably 90 to 50 weight percent, more preferably 85 to 70 weight percent.

The reactions are carried out under conditions sufficient to cause multifunctional coupling in the first coupling step and difunctional coupling in the second coupling step. The temperature of the coupling steps can be any effective temperature and is generally between about 30° and about 150° C. Preferably the temperatures is between 50° and 130° C., and more preferably 80° to 110° C. The temperature of the first and second coupling steps can be the same or different. Excess physical conditions, such as higher reaction temperatures, should be avoided in the second coupling step to minimize deleterious reactions.

Polymer Recovery

At the conclusion of the two-step coupling process, the system is treated with an active hydrogen compound such as water, alcohol, phenols or linear saturated aliphatic mono" and dicarboxylic acids to remove the lithium from the polymer. Preferably, the polymer cement, i.e. the polymer in the polymerization solvent, is treated with terminating agents such as water and carbon dioxide.

The resins are then stabilized with suitable stabilizers, for example, a combination of a hindered phenol and an organophosphite, specifically, octadecyl 3-(3',5'-di-t-butyl-4'-hydroxyphenyl) propionate and tris-nonylphenylphosphite. After stabilization, the hydrocarbon diluent is then flashed off the polymer solution to increase the solids content.

The resulting copolymers have a melt flow according to ASTM D 1238-86 at 200° C. with a 4.9 kg weight from about 1 to about 15 g/10 min.; more preferably, from about 5 to about 10 g/10 min.; most preferably, from about 6 to about 8 g/10 min.

The Copolymers

The polymodal resinous block copolymers produced by the methods of this invention contain mixture of two or more different length butadiene-styrene copolymers coupled with a multifunctional coupling agent and an essentially difunctional coupling agent. The fraction of polymer coupled with the multifunctional coupling agent is substantially branched; the fraction of polymer coupled with the difunctional coupling agent is substantially linear.

The following examples will describe in more detail the experimental process used and the polymodal block copolymers obtained as a result of the process.

EXAMPLES

In the following examples, dried cyclohexane (85%), butadiene (Texas El Paso), and styrene (Stirling Chemical) were used. The dried cyclohexane and styrene were given a nitrogen sparge and the solvent and monomers were stored in charge tanks. Dry, uninhibited monomers were stored in a deep freezer. n-Butyllithium was purchased from Lithium Corporation of America and was charged as a 2 weight percent solution in cyclohexane. Coupling agents used are listed below:

| Coupling Agent | Source | Charge Solution |
| --- | --- | --- |
| Tetramethoxysilane | PCR Inc. | 0.2g/mL in Cyclohexane |
| Tetraethoxysilane | PCR Inc. | 0.2g/mL in Cyclohexane |
| Dimethylisophthalate | Aldrich | 0.2g/mL in Tetrahydrofuran |
| Epoxidized Vegetable Oil (Vikoflex 7170) | Viking Chemical | 0.5g/mL in Cyclohexane |

Polymerizations were carried out in an 8.8 liter stainless steel reactor. The monomer, solvent, and initiator charge tanks were connected with direct lines to the reactor. Weights of solvent, monomer, and initiator charged to the reactor were determined by measuring differences in weight on an electronic balance. Pressure was maintained by nitrogen and polymerizations were adiabatic once initiated at 50° C. When required, warming was controlled by automatically-regulated, steam addition to the water jacket.

The following polymerization recipe was used in the examples with changes in coupling agents and n-butyllithium levels. phm is the quantity in parts per hundred parts by weight of total monomer charge.

| Polymerization Recipe | |
| --- | --- |
| Component | Concentration (phm) |
| Cyclohexane | 210 |
| Styrene | 75 |
| Butadiene | 25 |
| Tetrahydrofuran (THF) | 0.04 |

-continued

| Polymerization Recipe | |
|---|---|
| Component | Concentration (phm) |
| n-Butyllithium | approx. 0.18 |
| Coupling Agents | 0.40 |

Charge Order

| | | |
|---|---|---|
| Step #1 | Cyclohexane | 140 |
| | Tetrahydrofuran | 0.04 |
| | n-Butyllithium | 0.031 |
| | Styrene | 40 |
| | Cyclohexane[a] | 23.4 |
| | Time (min.) | 12 |
| Step #2 | n-Butyllithium | 0.033 |
| | Styrene | 20 |
| | Time (min.) | 12 |
| | Butadiene[a] | 8 |
| | Cyclohexane | 20 |
| | Time (min.) | 16 |
| Step #3 | n-Butyllithium[b] | 0.114 |
| | Styrene | 15 |
| | Time (min.) | 12 |
| Step #4 | Butadiene[a] | 17 |
| | Cyclohexane | 20 |
| | Time (min.) | 16 |
| Step #5 | Temp., °C. | 90 |
| | Polyfunctional Coupling Agent | Variable (x)[c] |
| | Cyclohexane | 6.6 |
| | Time (min.) | 10 |
| Step #6 | Temp., °C. | 90 |
| | Difunctional Coupling Agent | 0.4−x[c] |
| | Cyclohexane[a] | 6.6 |
| | Time (min.) | 16 |
| | Work Up Water | 0.2 |
| | Time (min.) | 5 |
| | Carbon Dioxide | 0.4 |
| | Time (min.) | 20 |
| | Antioxidant | 1.25 |
| | Time (min.) | 5.0 |
| | Temp., °C. | 90 |
| | Flash Polymer solution @ 178-180° C. | |

[a]After each addition of monomer, initiator, or additive the feed lines were rinsed with 91 g. cyclohexane solvent.
[b]The third n-butyllithium charge was adjusted to control the final melt flow at 7.0-9.0 g/10 min.
[c]The amount of polyfunctional coupling agent (x) varies. The total amount of polyfunctional coupling agent and difunctional coupling agent is 0.4 phm; thus the amount of difunctional coupling agent is the difference between 0.4 phm and x.

Cyclohexane was flashed from the resin leaving about 14 weight percent cyclohexane in the polymer. The polymer was dried in a vacuum oven (92° C.) for one hour, chopped, and dried another hour in the vacuum oven.

Polymer molecular weight was determined by gel permeation chromatography using a Waters Ultrastyragel column with tetrahydrofuran as solvent and a UV detector. Melt flows were measured according to ASTM D 1238-86 using an extrusion plastometer at 200° C. with a 4.9 kg weight.

"Sag tests" of the inventive copolymer were done using extruded sheet. The test was done with a Comet Labmaster Model L-5 Thermoformer with the bottom heater on full and the top heater off. The dwell time was 60 seconds and sag was measured. The sheet thickness was measured with a TMI Model 549 Micrometer. Samples about 35.5 cm by about 15.5 cm were used. The samples were clamped at the ends of the longer dimension and the distance between clamps was 33 cm.

A laboratory test was developed to give an indication of the polymer melt strength. A Rheometrics Mechanical Spectrometer (RHS) (Rheometrics, Inc., Piscataway, N.J.) measures strain verses time at a constant stress. A low strain rate indicates more chain entanglements and a higher melt strength than a high strain rate. The strain rate tests were carried out with a cone and plate configuration to measure strain versus time at 190° C. with a constant stress of $1 \times 10^4$ dynes/cm$^2$. A minimum of for hours warm-up time was used to bring the RMS to equilibrium temperature before starting the test runs. Strain rates should be compared between samples with the same melt flow since the polymer melt strength is also a function of molecular weight.

EXAMPLE I

This example illustrates the preparation of butadiene-styrene copolymers with improved melt strength by partially coupling the living polymer with a multifunctional coupling agent [tetraethoxysilane - (OEt)° Si]and completion of the coupling with a conventional, essentially bifunctional coupling agent (Vikoflex 7170).

The polymers are summarized in Table 1. Polymers 1 and 2 are control resins made to different melt flows without a multifunctional coupling agent and with the Vikoflex coupling agent. Polymers 3 through 7 are invention polymers made with different levels of n-butyllithium, tetraethoxysilane, and Vikoflex.

Figure 1:
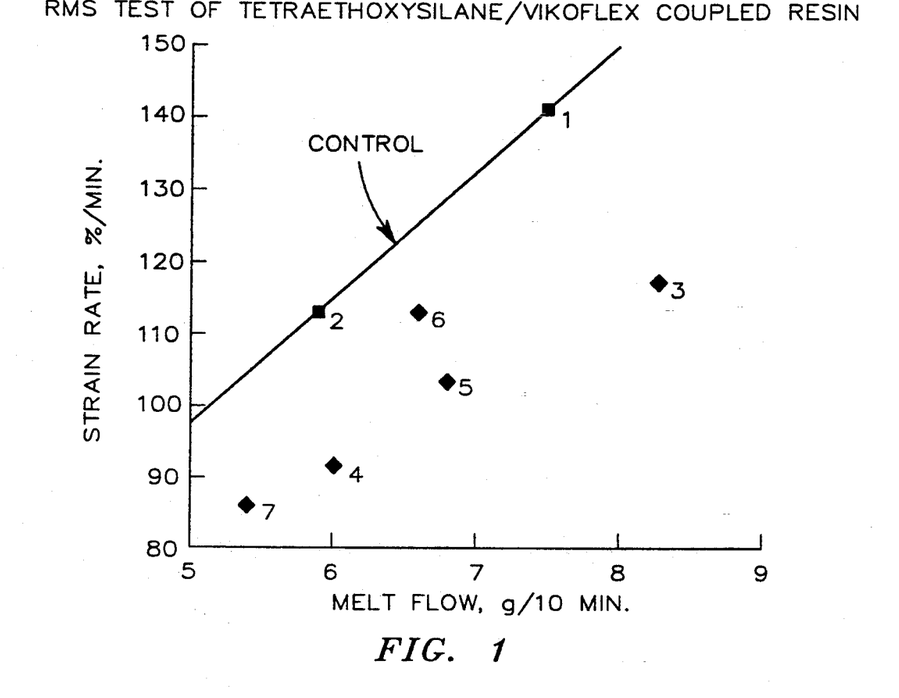
FIG. 1 is a graph of strain rates versus polymer melt flow when tetraethoxysilane coupling and difunctional coupling were done.

The Rheometrics Mechanical Spectrometer (RMS) strain rates in %/min at 190° C. for these polymers (Table 1) show that the invention polymers have lower values (higher melt strengths) than control polymers of the same viscosity. In order to clearly show the differences in values, the strain rate values from Table I are plotted in FIG. 1 versus the polymer melt flow. A line drawn through the two control polymer points shows the normal relationship between the melt flow and strain rate. Samples falling below the line, low strain rate, would be expected to show improved melt strengths over control polymers with the same melt flow. Invention samples 3 through 7 are clearly below the line, demonstrating improved melt strengths from the two-step coupling.

Gel permeation chromatography provides information about the polymer structures. Control Polymer 1 has a weight average molecular weight (Mw) of 138,000 atomic mass units (amu) and a number average molecular weight (Mn) of 89,000 amu for a Mw/Hn ratio of 1.55, while Control Polymer 2 has a Mw/Mn ration of 1.62. Invention Polymer 4 has a Mw of 156,000 amu and a Mn of 92,000 amu for a Mw/Mn ratio of 1.69, while Polymer 6 has a Mw/Mn ratio of 1.72.

TABLE I

Tetraethoxysilane Coupling

| Poly- mer | NBL phm #1 | NBL phm #2 | NBL phm #3 | Coupling Agent, phm #1 (EtO)$_4$Si | Coupling Agent, phm #2 Viko- flex | Melt Flow, g/10 min | Strain Rate, %/min |
|---|---|---|---|---|---|---|---|
| 1[a] | 0.031 | 0.032 | 0.100 | 0 | 0.40 | 7.5 | 141 |
| 2[a] | 0.031 | 0.032 | 0.095 | 0 | 0.40 | 5.9 | 113 |
| 3 | 0.031 | 0.032 | 0.140 | 0.08 | 0.32 | 8.3 | 117 |
| 4 | 0.031 | 0.032 | 0.128 | 0.08 | 0.32 | 6.0 | 91 |
| 5 | 0.031 | 0.032 | 0.132 | 0.08 | 0.32 | 6.8 | 103 |
| 6 | 0.031 | 0.062 | 0.070 | 0.08 | 0.32 | 6.6 | 113 |
| 7 | 0.031 | 0.032 | 0.123 | 0.08 | 0.32 | 5.4 | 86 |

[a]Control runs

EXAMPLE II

Figure 2:
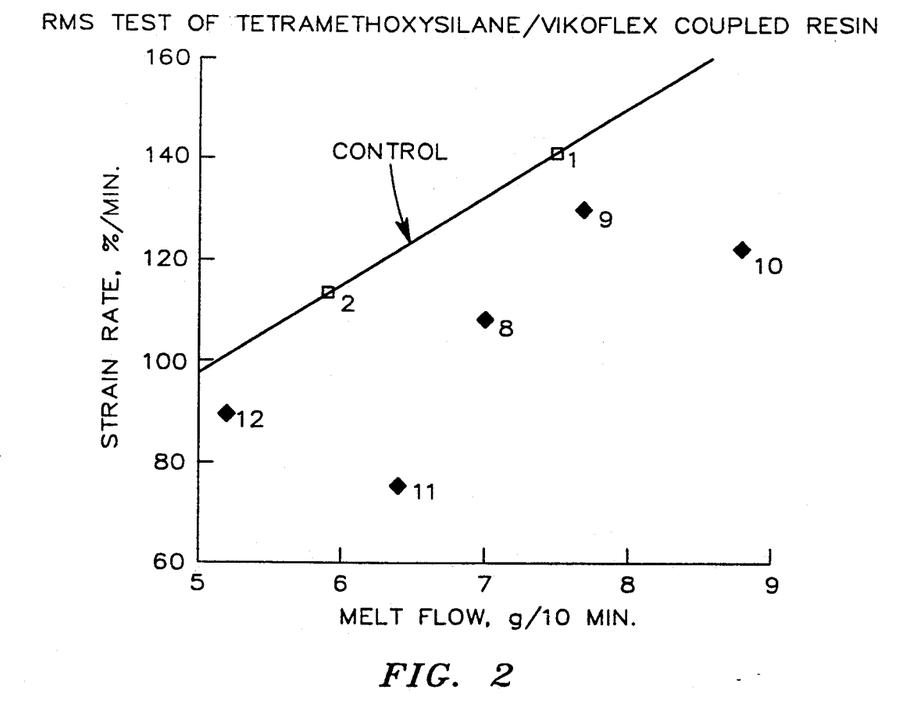
FIG. 2 is a graph of strain rates versus polymer melt flow when tetramethoxysilane coupling and difunctional coupling were done.
Figure 3A:
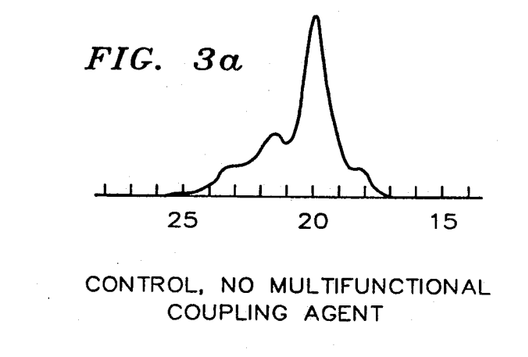
FIG. 3 shows molecular weight distribution curves of a control polymer and of an experimental polymer at several points during polymerization.
Figure 3B:
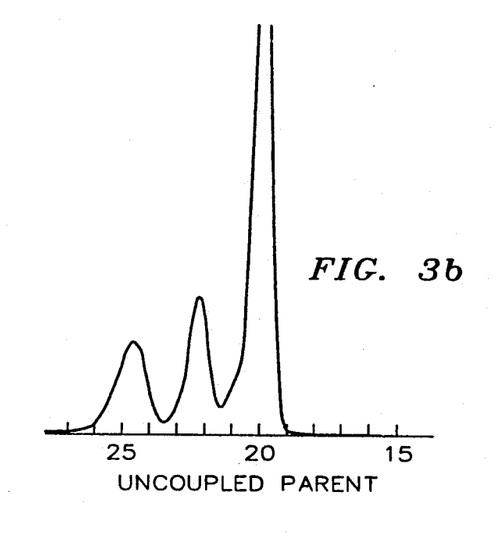
Figure 3C:
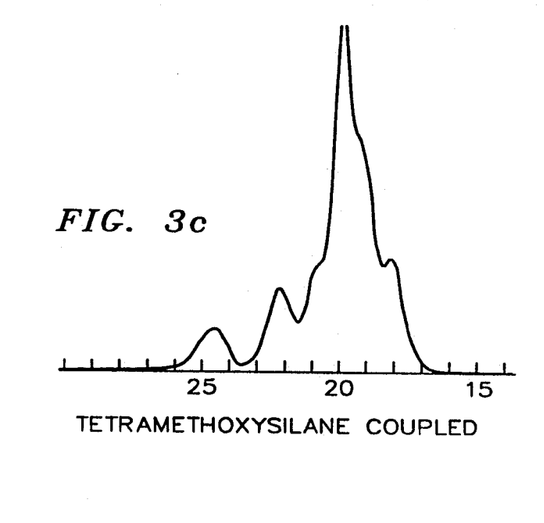
Figure 3D:
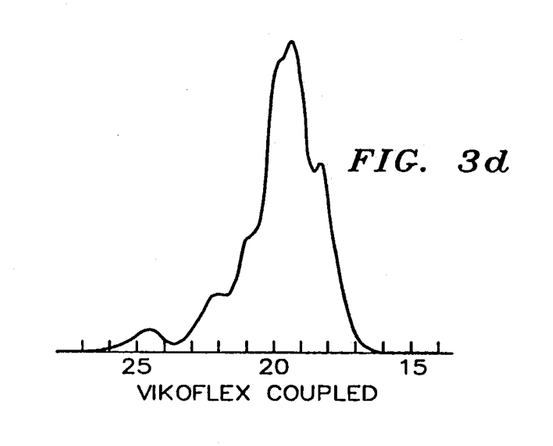

Tetramethoxysilane [(OMe)$_4$Si] was used as the multifunctional coupling agent in this example. The polymers recipes and strain rates are shown in Table II. Plots of the polymer strain rates against melt flows are shown in FIG. 2. Polymers 8 through 12 have strain rates well below the line drawn through the points for control Polymers 1 and 2 indicating higher melt strengths for invention polymers 8 through 12.

TABLE II

| | Tetramethoxysilane Coupling | | | | | |
|---|---|---|---|---|---|---|
| | | | Coupling Agent, phm | | | |
| Polymer No. | NBL, phm | | | #1 (MeO)₄Si | #2 Viko-flex | Melt Flow g/10 min | Strain Rate %/min |
| | #1 | #2 | #3 | | | | |
| 8 | 0.031 | 0.032 | 0.135 | 0.04 | 0.36 | 7.0 | 108 |
| 9 | 0.031 | 0.040 | 0.135 | 0.06 | 0.34 | 7.7 | 130 |
| 10 | 0.034 | 0.034 | 0.125 | 0.06 | 0.34 | 8.8 | 122 |
| 11 | 0.034 | 0.034 | 0.113 | 0.06 | 0.34 | 6.4 | 75 |
| 12 | 0.031 | 0.034 | 0.135 | 0.06 | 0.34 | 5.2 | 85 |

A gel permeation chromatography examination of Polymer 9 shows that it has a Mw of 166,000 amu and Mn of 95,000 amu for a Hw/Hn ratio of 1.75.

The difference in structure between polymers made according to the present invention compared with polymers made with only bifunctional coupling agents is readily seen in the molecular weight distribution (MWD) curves produced by gel permeation chromatography. The ordinate (vertical) scale represents the magnitude of the peaks and the abscissa (horizontal) scale represents the gpc elution count in arbitrary units for comparison of figures. In FIG. 3, curve 3a is a HWD curve of a typical control polymer made with a bifunctional coupling agent. Curves 3b, 3c, and 3d are MWD curves of the polymerization mixture at several points during the polymerization of a polymer made in a manner similar to that used for the preparation of Polymer 8. Curve 3b shows the MWD after all three n-butyllithium charges and clearly shows the three different polymer segments before any coupling. The multifunctional coupling (curve 3c) changes the gpc trace, especially the shape of the larger (highest molecular weight) peak. After the Vikoflex coupling step (curve 3d), further changes in the curve occur. A comparison of curve 3d with 3a clearly shows the changes in MWD by the process of this invention.

EXAMPLE III

Figure 4:
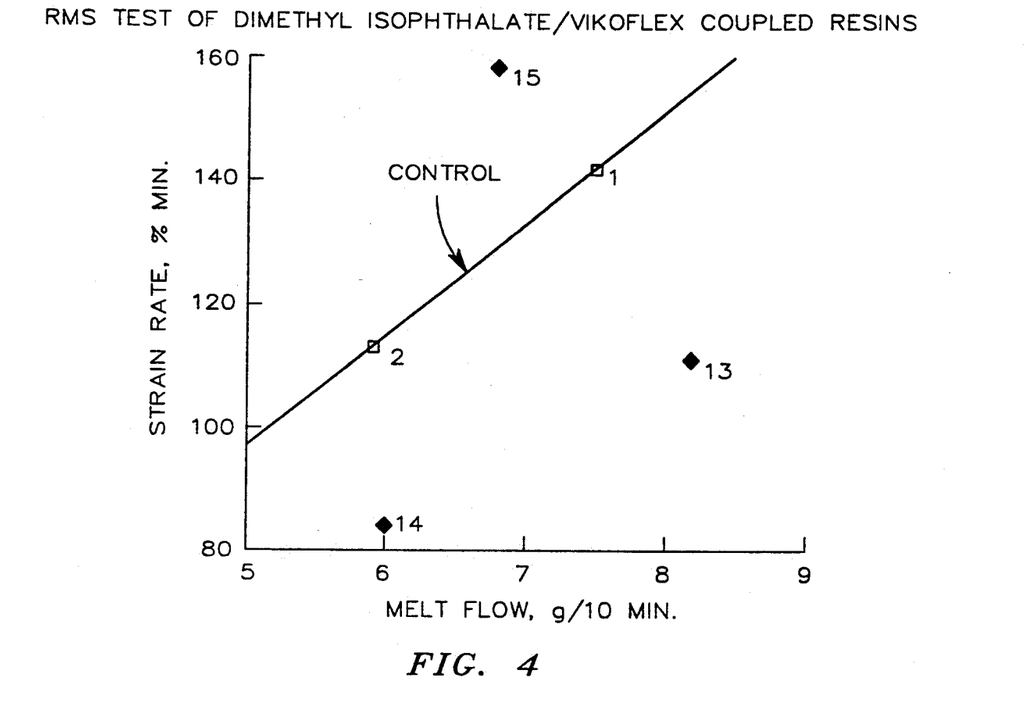
FIG. 4 is a graph of strain rates versus polymer melt flow when dimethyl isophthalate coupling and difunctional coupling were done.

Several polymers were prepared using dimethyl isophthalate (DMIP) as the multifunctional coupling agent. Polymers 13, 14, and 15 are described in Table III with their melt flows and strain rates. Plots in FIG. 4 of the polymer melt flow against strain rate show that Polymers 13 and 14 are below the line through the two control polymers. Polymers made with DMIP have unusually low Mw/Mn ratios. Polymer 14 has a Mw of 139,000 amu and a Mn of 125,000 amu for a Mw/Mn ratio of 1.11. Polymer 15 has a Mw/Hn ratio of only 1.06, indicating relatively low multifunctional coupling under these conditions. The DMIP has a relatively low solubility in cyclohexane. At the lower level of DMIP (0.06 phm) used in Polymer 15, a longer reaction time is believed to be needed to obtain enough multifunctional coupling for good melt strength.

TABLE III

| | Dimethylisophthalate Coupling | | | | | | |
|---|---|---|---|---|---|---|---|
| | | | | Coupling Agent, phm | | | |
| Polymer No. | NBL, phm | | | #1 DMIP^a | #2 Viko-flex | Melt Flow, g/10 min | Strain Rate, %/min |
| | #1 | #2 | #3 | | | | |
| 13 | 0.031 | 0.032 | 0.132 | 0.08 | 0.32 | 8.2 | 111 |
| 14 | 0.031 | 0.032 | 0.125 | 0.08 | 0.32 | 6.0 | 84 |
| 15 | 0.031 | 0.032 | 0.125 | 0.06 | 0.34 | 6.8 | 158 |

^aDMIP = Dimethyl isophthalate

EXAMPLE IV

A sag test was used to further demonstrate the advantages of polymers prepared according to the present invention. A sheet about 0.57 mm thick was extruded from the polymers and held in a hot thermoformer. After the sheet had been heated for 60 seconds, the amount of sag was measured. As shown in Table IV, polymers prepared with both a multifunctional coupling agent and a bifunctional coupling agent had less sag than control polymers made without the multifunctional coupling agent. Higher melt strength polymers would be expected to sag less than polymers with low melt strength.

TABLE IV

| | Sag Test | | | |
|---|---|---|---|---|
| Polymer No. | Coupling Agent | Melt Flow, g/10 min | Sheet Thickness, mm | Sag, mm |
| 1^a | Vikoflex, 0.4 phm | 7.5 | 0.58 | 66.7 |
| 2^a | Vikoflex, 0.4 phm | 5.9 | 0.58 | 54.0 |
| 5 | Tetraethoxysilane, 0.08 phm/ Vikoflex, 0.32 phm | 6.8 | 0.56 | 54.0 |
| 6 | Tetraethoxysilane, 0.08 phm/ Vikoflex, 0.32 phm | 6.6 | 0.56 | 57.2 |
| 8 | Tetraethoxysilane, 0.04 phm/ Vikoflex, 0.36 phm | 7.0 | 0.56 | 46.6 |
| 9 | Tetraethoxysilane, 0.06 phm/ Vikoflex, 0.34 phm | 7.7 | 0.56 | 50.8 |

^aControl polymers.

Figure 5:
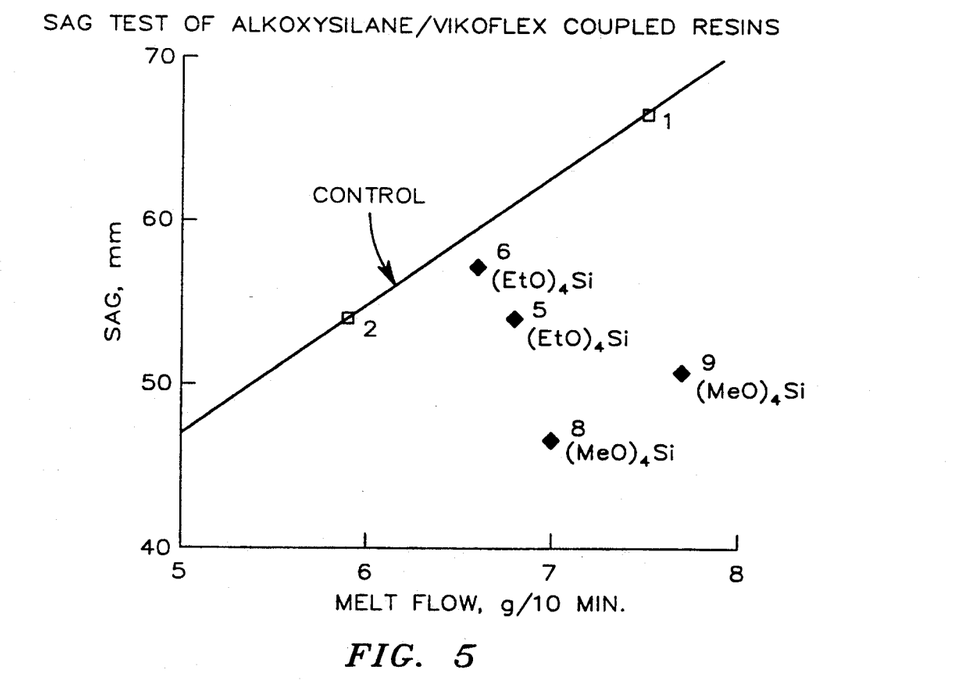
FIG. 5 is a graph of results of sag tests of controls and of the experimental polymer.

The sag test results are plotted in FIG. 5 against polymer melt flow values. All invention sample points are located below the control line, indicating better melt strength for polymers made with the two-step coupling.

EXAMPLE V

Physical properties of several of the polymers from the above examples were determined by injection molding test specimens for evaluation. The results are described in Table V. Polymers 16 and 17 are control polymers prepared in a manner similar to Polymers 1 and 2, but with larger reactor volumes. Polymer 18 was prepared using tetraethoxysilane in a manner similar to that used for the preparation of Polymer 5, but with a larger reactor volume. Polymers 16, 17, and 18 have melt flow values in g/10 min of 6.1, 8.1 and 8.5, respectively. The strain rates in %/min. of polymers 16, 17 and 18 are 100, 143 and 85, respectively.

TABLE V

| | Polymer Physical Properties | | | | | | |
|---|---|---|---|---|---|---|---|
| Sample No. | Haze/ Blueness | Flexural Modulus, MPa | Tensile, MPa | | Elongation, % | | Izod Impact^a |
| | | | Yield | Break | Yield | Break | |
| 16^b | 2.0/−4.5 | 1489 | 28 | 30 | 4.2 | 264 | 10.3 |
| 17^b | 1.6/−6.4 | 1488 | 27 | 30 | 4.4 | 265 | 16.7 |

TABLE V-continued

| Sample No. | Haze/ Blueness | Polymer Physical Properties | | | | | |
|---|---|---|---|---|---|---|---|
| | | Flexural Modulus, MPa | Tensile, MPa | | Elongation, % | | Izod Impact[a] |
| | | | Yield | Break | Yield | Break | |
| 18[c] | 3.6/−3.5 | 1448 | 27 | 26 | 4.1 | 233 | 12.8 |
| 3[c] | 4.9/−4.4 | 1472 | 26 | 27 | 3.4 | 236 | 16.3 |
| 10[d] | 3.1/−3.2 | 1509 | 31 | 26 | 4.2 | 231 | 11.2 |
| 11[d] | 4.5/−3.2 | 1409 | 30 | 30 | 4.2 | 282 | 15.1 |
| 13[e] | 1.9/−7.9 | 1408 | 23 | 26 | 4.6 | 252 | 31.7 |
| 14[e] | 3.2/−4.8 | 1457 | 27 | 29 | 4.2 | 261 | 14.1 |
| 15[e] | 2.0/−6.3 | 1455 | 25 | 28 | 4.2 | 264 | 18.7 |

[a]Notched Izod, J/M
[b]Control polymers Vikoflex coupled
[c]Tetraethoxysilane/Vikoflex coupled
[d]Tetraethoxysilane/Vikoflex coupled
[e]Dimethyl isophthalate/Vikoflex coupled The results in Table V show that the invention polymers have physical properties similar to the control polymers. Variations in physical properties are also observed as a result of differences in melt flow. These results show that the two-step coupling technique of this invention does not cause a reduction in molded product properties.

EXAMPLE VI

Runs were made to compare invention polymers (made with sequential charges of a multifunctional coupling agent followed by a bifunctional coupling agent) with polymers coupled with a mixture of multifunctional and bifunctional coupling agents. Polymer 19 was an invention polymer prepared in a manner similar to Polymers 3, 4, 5, 6 and 7, with sequential coupling charges of first tetraethoxysilane (multifunctional) and then Vikoflex 7170 (bifunctional). Polymer 20 was a control polymer prepared in a manner similar to Polymer 19 with the exception that coupling was accomplished by charging with a mixture of multifunctional and bifunctional coupling agents (tetraethoxysilane and Vikoflex 7170). Preparation of polymers 19 and 20 is summarized in Table VIa.

TABLE VIa

| Preparation of Polymers 19 and 20 | | |
|---|---|---|
| | Invention Polymer 19 | Comparison Polymer 20 |
| Step #1 | Cyclohexane, 140 phm<br>Tetrahydrofuran, 0.04 phm<br>n-Butyllithium, 0.031 phm<br>Styrene, 40 phm<br>Cyclohexane, 23.4 phm<br>Time, 12 min | Cyclohexane, 140 phm<br>Tetrahydrofuran, 0.04 phm<br>n-Butyllithium, 0.031 phm<br>Styrene, 40 phm<br>Cyclohexane, 23.4 phm<br>Time, 12 min |
| Step #2 | n-Butyllithium, 0.033 phm<br>Styrene, 20 phm<br>Time, 12 min<br>Butadiene, 8 phm<br>Cyclohexane,[a] 20 phm<br>Time, 16 min | n-Butyllithium, 0.033 phm<br>Styrene, 20 phm<br>Time, 12 min<br>Butadiene, 8 phm<br>Cyclohexane,[a] 20 phm<br>Time, 16 min |
| Step #3 | n-Butyllithium, 0.112 phm<br>Styrene, 15 phm<br>Time, 12 min | n-Butyllithium, 0.0115 phm<br>Styrene, 15 phm<br>Time, 12 min |
| Step #4 | Butadiene, 17 phm<br>Cyclohexane,[a] 6.6 phm<br>Time, 16 min | Butadiene, 17 phm<br>Cyclohexane, 6.6 phm<br>Time, 16 min |
| Step #5 | Temperature, 76° C.<br>Polyfunctional coupling agent, 0.04 phm<br>Cyclohexane,[a] phm<br>Time, 10 min | Temperature, 80° C.<br>Difunctional coupling agent, 0.36 phm<br>Polyfunctional coupling agent, 0.04 phm<br>Cyclohexane[a] 6.6 phm<br>Time, 16 min |
| Step #6 | Temperature, 93° C.<br>Difunctional coupling agent, 0.36 phm<br>Cyclohexane,[a] 6.6 phm | |

TABLE VIa-continued

| Preparation of Polymers 19 and 20 | |
|---|---|
| Invention Polymer 19 | Comparison Polymer 20 |
| Time, 16 min<br>Work Up Water | |
| Carbon Dioxide 0.4 phm<br>Time, 20 min<br>Antioxidant 1.25 phm<br>Time, 5 min<br>Temperature, 90° C.<br>Flash Polymer solution<br>@ 178–180° C. | Carbon Dioxide 0.4 phm<br>Time, 20 min<br>Antioxidant 1.25 phm<br>Time, 5 min<br>Temperature, 90° C.<br>Flash Polymer solution<br>@ 178–180° C. |

[a]After each addition of monomer, initiator, or additive the feed line rinsed with 91 g. cyclohexane solvent.

Comparison of Polymers 19 and 20 showed that there are significant important differences between polymers made with a mixture of multifunctional and difunctional coupling agents rather than sequential charges of the same coupling agents. The strain rates of Polymer 19 was measured in %/min at 190° C. using a Rheometrics Mechanical Spectrometer. The strain rate of Polymer 20 was not measured because at the time of the research Polymer 20 was so different from Polymer 19 that it was considered a "failure". Melt flows were measured using an extrusion plastometer at 200° C. with 4.9 Kg weight. Gel permeation chromatography was used to investigate the polymer molecular weight distributions. Some of the properties and characteristics of these two polymers are shown in Table VIb.

TABLE VIb

| Comparison of Properties of Sequentially Coupled Polymers with Properties of Polymers Coupled with a Mixture of Coupling Agents | | |
|---|---|---|
| | Invention Polymer 19 | Comparison Polymer 20 |
| First coupling step | Tetraethoxysilane | Tetraethoxysilane and Vikoflex 7170 |
| Second coupling step | Vikoflex 7170 | none |
| Melt flow, g/10 min | 4.7 | 9.5 |
| Strain rate, %/min | 67.4 | — |
| Weight average molecular weight, amu | 130,000 | 106,000 |
| Number average molecular weight, amu | 78,000 | 70,000 |
| Mw/Mn ratio | 1.7 | 1.5 |
| Character of coupling in final product | branching and di-chain | essentially all di-chain |

The molecular weight and the Mw/Mn ratio of Polymer 19 are greater than those of Polymer 20. These differences are both indicative of multiple coupling. The larger heterogenity index (Mw/Mn ratio) of Polymer 19 indicates a broader molecular distribution. The final melt flows of the two polymers were dramatically different. This difference in final melt flows is even more striking when considered in view of the similar molecular weights and is indicative of completely different molecular structures. Gel permeation chromatography results were consistent with this conclusion.

While the methods and polymers of this invention have been described in detail for the purpose of illustration, the inventive methods and polymers are not to be construed as limited thereby. This patent is intended to cover all changes and modifications within the spirit and scope of this patent.

That which is claimed is:

1. A method for preparing a polymer comprising:
solution polymerization of at least two charges, at least one of said charges being a conjugated diene and at least one of said charges being a monovinylarene, to produce growing polymer chains; thereafter
charging an amount of a polyfunctional coupling insufficient for complete coupling of said growing polymer chains;
after substantially complete reaction of said polyfunctional coupling agent, charging with a difunctional coupling agent.

2. A method for preparing a polymer comprising:
solution polymerization of at least one monovinylarene monomer and at least one conjugated diene monomer in a ratio of about 55 to 95 weight percent monovinylarene and 45 to 5 weight percent conjugated diene, by a sequential charge polymerization process to produce growing polymer chains;
wherein at least two separate charges consisting of said conjugated diene at least two separate charges consisting of said monovinylarene, and at least two charges of a monoalkali metal initiator are employed;
one separate charge of each of said monovinylarene and of said conjugated diene follows the last charge of said monoalkali metal initiator;
at least one separate charge of said conjugated diene precedes the last charge of said monoalkali metal initiator;
each separate monomer charge homopolymerizes to substantial completion prior to addition of any subsequent charge;
thereafter coupling with an amount of a polyfunctional coupling agent insufficient for complete coupling of said growing polymer chains; and
after substantially complete reaction of said polyfunctional coupling agent, coupling with a difunctional coupling agent.

3. A method as recited in claim 2 wherein said ratio is about 60 to bout 90 weight percent monovinylarene and about 40 to about 10 weight percent conjugated diene.

4. A method as recited in claim 3 wherein said ratio is about 65 to about 85 weight percent monovinylarene and about 35 to about 15 weight percent conjugated diene.

5. A method as recited in claim 1
wherein said polyfunctional coupling agent is an alkoxysilane and said difunctional coupling agent is one selected from the group of dialdehydes, diketones, dihalosilanes, diepoxides, monoesters, lactones, vegetable oils and epoxidized vegetable oils.

6. A method as recited in claim 1
wherein said polyfunctional coupling agent is a cyclic anhydride and said difunctional coupling agent is one selected from the group of dialdehydes, diketones, dihalosilanes, diepoxides, monoesters, lactones, vegetable oils and epoxidized vegetable oils.

7. A method as recited in claim 1
wherein said polyfunctional coupling agent is a diester and said difunctional coupling agent is one selected from the group of dialdehydes, diketones, dihalosilanes, diepoxides, monoesters, lactones, vegetable oils and epoxidized vegetable oils.

8. A method as recited in claim 1
wherein said monovinylarene is styrene, said conjugated diene is butadiene, said polyfunctional coupling agent is one selected from the group of dimethyl isophthalate, tetramethoxysilane, tetraethoxysilane, and phthalic anhydride, and said difunctional coupling agent is epoxidized vegetable oil.

9. A method as recited in claim 8 wherein said polyfunctional coupling agent is tetramethoxysilane.

10. A method as recited in claim 8 wherein said polyfunctional coupling agent is tetraethoxysilane.

11. A method a method as recited in claim 8 wherein said polyfunctional coupling agent is phthalic anhydride.

12. A method for preparing a polymer comprising:
solution polymerization of at least one monovinylarene monomer and at least one conjugated diene monomer in a ratio of about 55 to 95 weight percent monovinylarene and about 45 to 5 weight percent conjugated diene, by a sequential charge polymerization process to produce growing polymer chains,
said sequential charge polymerization process comprising:
charging with a monovinylarene and a monoalkali metal initiator;
charging with a monovinylarene and a monoalkali metal initiator;
charging with a conjugated diene monomer;
charging with a conjugated diene monomer;
charging with an amount of a polyfunctional coupling agent insufficient for complete coupling of said growing polymer chains;
after substantially complete reaction of said polyfunctional coupling agent, charging with a difunctional coupling agent.

13. A method as recited in claim 12 wherein said ratio is about 60 to about 90 weight percent monovinylarene and about 40 to about 10 weight percent conjugated diene.

14. A method as recited in claim 13 wherein said ratio is about 65 to about 85 weight percent monovinylarene and about 35 to about 15 weight percent conjugated diene.

15. A method as recited in claim 12 wherein said at least one monovinylarene monomer is styrene, said at least one conjugated diene monomer is butadiene, said monoalkali initiator is n-butyllithium, said polyfunctional coupling agent is tetraethoxysilane, and said difunctional coupling agent is epoxidized vegetable oil.

16. A copolymer prepared by the method of claim 1.

17. Articles made from the copolymer of claim 16.

* * * * *

UNITED STATES PATENT AND TRADEMARK OFFICE
CERTIFICATE OF CORRECTION

PATENT NO. : 5,270,396
DATED : December 14, 1993
INVENTOR(S) : Ralph C. Farrar, Jr., et al It is certified that error appears in the above-indentified patent and that said Letters Patent is hereby corrected as shown below:

In column 13, claim 2, line 38, insert --- at least --- next preceding the word "one".

In column 13, claim 3, line 54, delete "bout" and substitute therefor --- about ---.

In column 14, claim 11, line 24, please delete "a method", second occurrence.

In column 14, claim 12, between lines 41 and 42, please insert --- charging with a monovinylarene and a monoalkali metal initiator; ---.

In column 14, claim 15, line 60, insert --- metal --- next preceding "initiator".

Signed and Sealed this

Eighteenth Day of October, 1994

Attest:

BRUCE LEHMAN

Attesting Officer   Commissioner of Patents and Trademarks